Nov. 24, 1964  H. A. STRECKER  3,158,563
PROCESS FOR REJUVENATION OF HYDROCRACKING CATALYSTS
Filed March 27, 1962
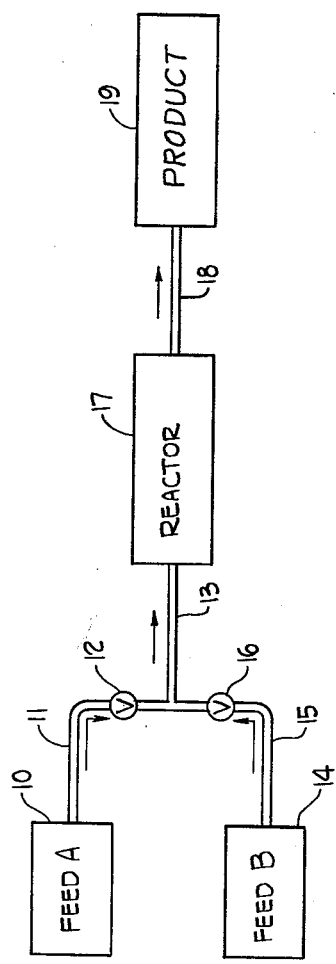
INVENTOR.
HAROLD A. STRECKER
BY
Schramm, Kramer & Sturges
ATTORNEYS.

ent Office 3,158,563
Patented Nov. 24, 1964

3,158,563
PROCESS FOR REJUVENATION OF
HYDROCRACKING CATALYSTS
Harold A. Strecker, Bedford, Ohio, assignor to The
Standard Oil Company, Cleveland, Ohio, a corporation of Ohio
Filed Mar. 27, 1962, Ser. No. 182,796
7 Claims. (Cl. 208—111)

The present invention relates to an improved process for the rejuvenation of hydrocracking catalysts. More particularly the process relates to the rejuvenation of catalysts which have been deactivated by contact with nitrogen compounds.

A hydrocracking process may be defined as a process in which high boiling hydrocarbon stocks are subjected to elevated temperatures and pressures in the presence of a catalyst and added hydrogen whereby the feed stocks are simultaneously cracked and hydrogenated to produce a substantial quantity of material boiling within the gasoline boiling range. Hydrocracking processes are usually operated at pressures on the order of 500 to 5000 p.s.i., preferably in the range of 900 to 1200 p.s.i. The usual operating temperature falls within the range of 500° F. to 900° F., preferably in the range of 550° F. to 750° F. As mentioned above, it is necessary to add hydrogen along with the feed to the hydrocracking reactor and the rate of hydrogen addition will fall within the range of 200 to 10,000 s.c.f. of hydrogen per barrel of fresh feed, the exact quantity of hydrogen to be added being determined by the nature of the feed stock. Space velocities within the hydrocracking reactor on the order of 0.5 to 5 volumes of hydrocarbon per volume of catalyst per hour are utilized. A part of the reactor effluent, usually the highest boiling fraction, may be recycled to the reactor for further treatment, if desired.

Catalysts employed in the hydrocracking process are of the so-called dual functional type. Such catalysts contain an acidic ingredient which serves as the cracking element in the catalyst. Materials such as silica-alumina, silica-magnesia, silica-alumina-zirconia, beryllium oxide, fluorinated alumina or various acid-treated clays may be employed to supply the acidic ingredient of the catalyst. Preferred acidic ingredients are synthetically prepared silica-aluminas having silica contents in the range of from about 40 to 99%.

The other necessary element of the catalyst is the hydrogenation ingredient and it may be selected from any of the metals in Groups V to VIII of the Periodic Table and/or their oxides or sulphides. Illustrative of suitable hydrogenation ingredients are the oxides or sulphides of molybdenum, tungsten, vanadium and chromium. Compounds such as the oxides and sulphides of iron, nickel and cobalt are particularly suitable. Metallic platinum and palladium are also eminently suitable. In general, the hydrogenating ingredient will comprise about 0.1 to about 25% by weight of the composite catalyst.

Due to the acidic nature of the hydrocracking catalysts they tend to be poisoned or deactivated rather rapidly by small amounts of nitrogen compounds when such compounds are present in the feed stock. Most petroleum stocks which are usually employed as hydrocracking feed stocks contain substantial quantities of such nitrogen compounds. Heretofore, it has been necessary to resort to various feed pre-treating techniques in order to remove these deleterious nitrogen compounds from the feed. One such pre-treating technique is hydrofining which involves treatment of the feed stock at elevated temperatures and pressures with a catalyst such as cobalt molybdate in the presence of added hydrogen. Such treatment converts the nitrogen compounds to more volatile compounds which may be substantially completely removed from the stock without difficulty.

In the case of high boiling feedstocks, i.e. boiling above 800° F., such as a reduced crude, the hydrofining treatment is not capable of reducing the nitrogen content to a level of less than 10 parts per million and, for this reason, it has been thought that such stocks are not suitable as feed for a hydrocracking unit since they tend to poison the catalyst.

It has now been discovered however that a hydrocracking catalyst which has been deactivated by contact with heavy feedstocks containing significant quantities of nitrogen compounds (500 to 2500 parts per million) may be rejuvenated by contacting the catalyst with a feed stock containing less than about 10 p.p.m. by weight of nitrogen compounds under hydrocracking conditions and it is this discovery which forms the basis for the process of the present invention. Apparently the nitrogen compounds are gradually desorbed from the catalyst during this operation.

Briefly stated in its broadest aspect, the process of the present invention is carried out by contacting a deactivated hydrocracking catalyst with a feed stock containing less than about 10 parts per million by weight of nitrogen. Another aspect of the invention relates to the hydrocracking of feed stock boiling above 800° F. and containing about 500 to 2500 parts per million by weight of nitrogen. Various modifications of these basic process steps are contemplated within the scope of the present invention as will be apparent from the following disclosure.

The attached patent drawing shows schematically the process of this invention. Referring now to this drawing, feed A (10) is a reduced crude having a nitrogen content above 500 parts per million by weight and boiling over 800° F. is introduced through conduit 11, open valve 12 and conduit 13 into a conventional hydrocracking reactor 17 containing a fresh hydrocracking catalyst. The hydrocracked product is removed from the reactor 17 through conduit 18 to a product storage area 19. During this phase of the process, valve 16 is closed. When the catalyst in reactor 17 becomes deactivated to a substantial degree due to the presence of the nitrogen in the feed, valve 12 is closed and the feed is switched to feed B (14) by the expedient of opening the valve 16. Feed B contains less than about 10 parts per million by weight of nitrogen and has a boiling range of 350 to 700° F. Hence, feed now flows through conduit 15, and valve 16 to the reactor 17. The product from the reactor 17 is withdrawn through conduit 18 to a product storage area 19. When the catalyst in reactor 17 has been rejuvenated (restored to near its original level of activity) valve 16 is closed and valve 12 is opened so that the feed stock is once again feed A. This cycle may be repeated over and over again.

In order to provide a specific example of the process, a laboratory reactor was filled with a tungsten sulphide catalyst which was prepared according to the following procedure. An acid treated clay was prepared by combining 250 g. of clay with 500 mls. of 10% aqueous solution of hydrogen fluoride. The resulting slurry was centrifuged washed with distilled water and dried at 300° F. A solution of tungsten sulphide was prepared by dissolving 16.5 g. of sodium tungstate in water and then adding concentrated HCl. The resulting precipitate was dissolved in concentrated ammonium hydroxide and this solution was then treated with 84.4 g. of an 8% solution of ammonium sulphide which resulted in the formation of a green solution.

Next 121 g. of the acid-treated clay was impregnated with the green solution of tungsten sulphide and then dried for 6 hours at 280° F. The dried catalyst was then heated to about 780° F. in the presence of hydrogen.

The final catalyst composition contained 10% by weight of tungsten sulphide.

During the test, this reactor was maintained at about 725° F. and at a pressure of about 900 pounds per square inch. The space velocity of the feed within the reactor was maintained at 1.5 volumes of feed per volume of catalyst per hour and hydrogen was added to the reactor along with the feed at the rate of 1200 l. (measured at STP) per l. of feed. The catalyst activity in this test was measured in terms of conversion which is defined as follows:

$$\text{Percent conversion} = 100 - \left(\frac{\text{weight of unconverted residue}}{\text{weight of feed}} \times 100\right)$$

At the outset, the feed was a water white distillate boiling in the range of 400° F. to 525° F. which had a nitrogen content of 1050 p.p.m. by weight. Initially the catalyst gave a conversion of 51.3%, but after three hours of operation the conversion level had fallen to 14.5%. At this point the feed was changed to a water white distillate having the same boiling range as the original feed but having a basic nitrogen content of only 2 p.p.m. by weight. After only 1.5 hours of operation on the latter feed stock, the activity of the catalyst was restored to a point where a conversion of about 37% was obtained. These data show that a deactivated catalyst may be rejuvenated by hydrocracking a feed stock having a low basic nitrogen content.

The term "deactivated catalyst" as used herein is not intended to imply that the catalyst exhibits no activity, but, rather that its activity is subsantially less than the activity of a fresh catalyst.

Various modifications of the process described herein may be made without departing from the spirit or scope of the present invention and this application for Letters Patent is intended to cover all such modifications as would reasonably fall within the scope of the appended claims.

I claim:
1. A hydrocracking process comprising contacting a hydrocracking catalyst in a conventional hydrocracking reaction zone with a first reduced crude oil feed having a nitrogen content above 500 parts per million by weight and boiling above 800° F. under hydrocracking conditions until the catalyst in said reaction zone becomes deactivated to a substantial degree, discontinuing the flow of said first reduced crude feed and substituting as the feed to said reaction zone while maintaining hydrocracking conditions a second reduced crude oil containing less than about 10 parts per million by weight of nitrogen and having a boiling range of 350 to 750° F. until the catalyst has been substantially regenerated, repeating the foregoing sequence of feeds and continuously recovering from the reactor the hydrocracked product.

2. The process of claim 1 wherein said hydrocracking catalyst consists essentially of tungsten sulphide deposited on an acid-treated clay support.

3. The process of claim 1 wherein said hydrocracking catalyst consists essentially of cobalt sulphide deposited on a silica-alumina support.

4. The process of claim 1 wherein said hydrocracking catalyst consists essentially of nickel sulphide deposited on a silica-alumina support.

5. The process of claim 1 wherein said hydrocracking catalyst consists essentially of metallic platinum deposited on a silica-alumina support.

6. The process of claim 1 wherein said hydrocracking catalyst consists essentially of metallic palladium deposited on a silica-alumina support.

7. The process of claim 1 wherein the first reduced crude oil contains from 500 to 2500 parts per million by weight of nitrogen.

References Cited in the file of this patent
UNITED STATES PATENTS

| | | |
|---|---|---|
| 2,614,068 | Healy et al. | Oct. 14, 1942 |
| 2,911,356 | Hanson | Nov. 3, 1956 |